Feb. 15, 1966   H. F. HERTWIG ETAL   3,234,709
CANNING MEAT

Original Filed April 25, 1962   2 Sheets-Sheet 1

INVENTORS
HENRY F. HERTWIG
ERWIN A. ZEMKE
GEORGE PILE
BY E. McCabe Attys

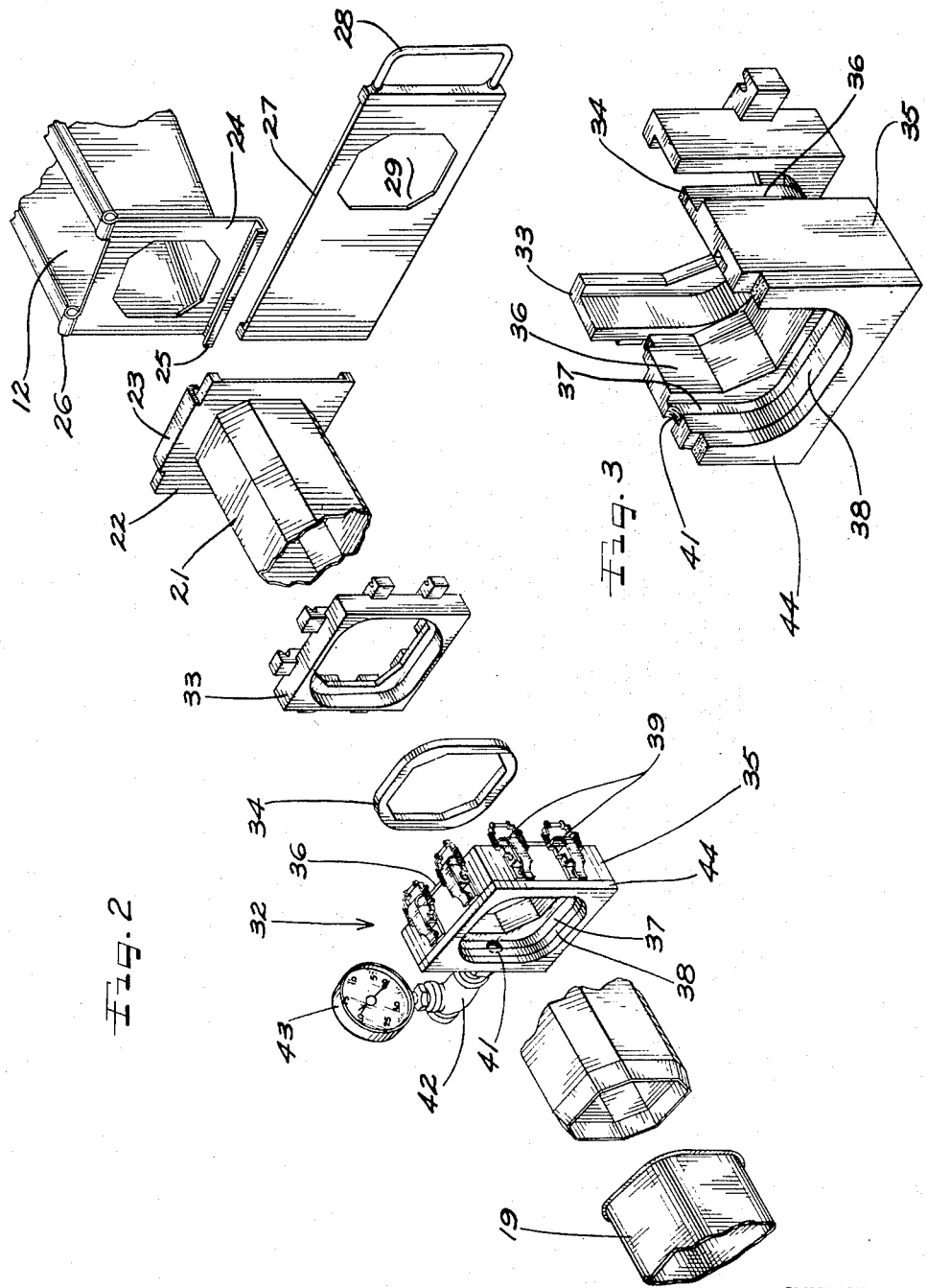

United States Patent Office 3,234,709
Patented Feb. 15, 1966

3,234,709
CANNING MEAT
Henry F. Hertwig, Berwyn, Erwin A. Zemke, Chicago, and George Pile, Rochelle, Ill., assignors to Swift & Company, Chicago, Ill., a corporation of Illinois
Original application Apr. 25, 1962, Ser. No. 190,005. Divided and this application Nov. 25, 1964, Ser. No. 419,626
6 Claims. (Cl. 53—122)

This application is a division of our copending application Serial No. 190,005 filed April 25, 1962.

The present invention relates to the insertion of plastic materials into containers, and specifically deals with an improved apparatus for inserting shaped bodies of food material such as "Pullman" type hams into cans.

"Pullman" type boned hams, and other boned pieces of meat, have been packaged in relatively large cans for consumer sales. Previously the bodies of meat have been preformed or shaped to the interior dimensions of a can and then inserted therein through a nozzle or stuffing horn either manually or by means of a press apparatus. Several press apparatus are available commercially. Generally speaking, such apparatus comprise a mold cavity, one end of which is openable into a short nozzle, and an end ram which longitudinally presses the meat and then is advanced into the nozzle to eject the meat into the can and thence push the meat and can from the nozzle. Thereafter the cans must be evacuated and sealed and retorted.

Similar techniques have also been employed for packaging meat items other than hams and also could be utilized to package other food materials such as brick cheese, butter, margarine, shortenings and the like.

The foregoing method and apparatus involve certain disadvantages. The most aggravating problem has been entrapment of air at the bottom of the container and within voids in the mass of food material therein. It will be understood that in the process of boning meat certain voids are created. During the subsequent pressing of the meat most air is expelled from these voids; however, when the meat is forced into a can the meat acts as a piston forcing air toward the bottom of the can from which some escapes into adjacent voids in the meat. Also, entrapment of air tends to distort the end of the meat so that it does not completely fill the bottom of the can and when it is subsequently removed the end is uneven and is wasted when sliced. Subsequent vacuumizing of the filled can must either be conducted for an inordinately long period or air is not completely exhausted from the can and its contents. The net result has been a high degree of early spoilage and a high percentage of rejection of sealed and retorted product.

A further disadvantage in the prior method and apparatus has been low rate of output for each operator and filling apparatus. A substantial period of time is required to press and preshape the meat in the apparatus. Thereafter the machine cannot be quickly reloaded with a new charge of meat since the end ram is utilized to force the meat completely into the can. It will be understood that during this process the machine operator has been required to manually and forcefully hold the can against the filling nozzle as the meat is ejected therein. Further, if the ram does not extend fully through the filling nozzle it is usually required that the operator manually pull the filled can therefrom. Only then is he free to refill the cavity with the next charge and repeat the performance.

Accordingly, it is a primary object of this invention to provide an improved apparatus for filling containers with shaped bodies of food material.

Another object of this invention is to provide an improved apparatus for filling containers with shaped bodies of food material wherein the interior of the container is evacuated while it is being filled.

Still another object of this invention is to provide an improved apparatus for filling containers with shaped bodies of food material whereby the food material has a better flat end when subsequently removed from the container.

Yet another object of this invention is to provide an improved apparatus for filling containers with shaped bodies of food material wherein the container is automatically held in position while being filled.

It is a further object of this invention to provide an improved apparatus for filling containers with shaped bodies of food material whereby a greater rate of production per operator and per machine may be achieved.

The present invention basically contemplates the steps of shaping a body of food material and thereafter ejecting the shaped material in a given direction into a holding zone. A container of a size to receive the material is placed in communication with the zone and air is withdrawn from the far end of the container, and from about the holding zone, to thereby draw the body of the material into the container and hold the container in communication with the zone. Thereafter a succeeding body of shaped material is forced into the holding zone whereby a positive pressure is created between the two bodies sufficient to expel the first body and container from communication with the holding zone.

An apparatus devised to carry out the foregoing method and adapted to be used in connection with existing press and shaping apparatus comprises an elongated nozzle means having a length substantially greater than the body of material to be canned, the nozzle being adapted to be secured to the discharge end of a press apparatus. A vacuum means is located on the exterior of the nozzle spaced from the press apparatus and adapted to withdraw air from a container placed over the opposite end of the nozzle through the space between the interior of the can and the nozzle wall. The volume of the nozzle between about the area of the vacuum manifold means and the press apparatus constitutes a holding zone into which the bodies of food material are inserted from the press. Such bodies of material will be drawn through the nozzle into the container placed thereover as the latter is evacuated through the vacuum means.

Further objects and advantages of the present invention will become apparent upon reading the following specification in conjunction with the accompanying drawings wherein:

FIGURE 2 is an exploded view of the present improvement with a container positioned to receive product; and FIGURE 3 is a perspective view of the vacuum manifold means with parts broken away.

Figure 1:
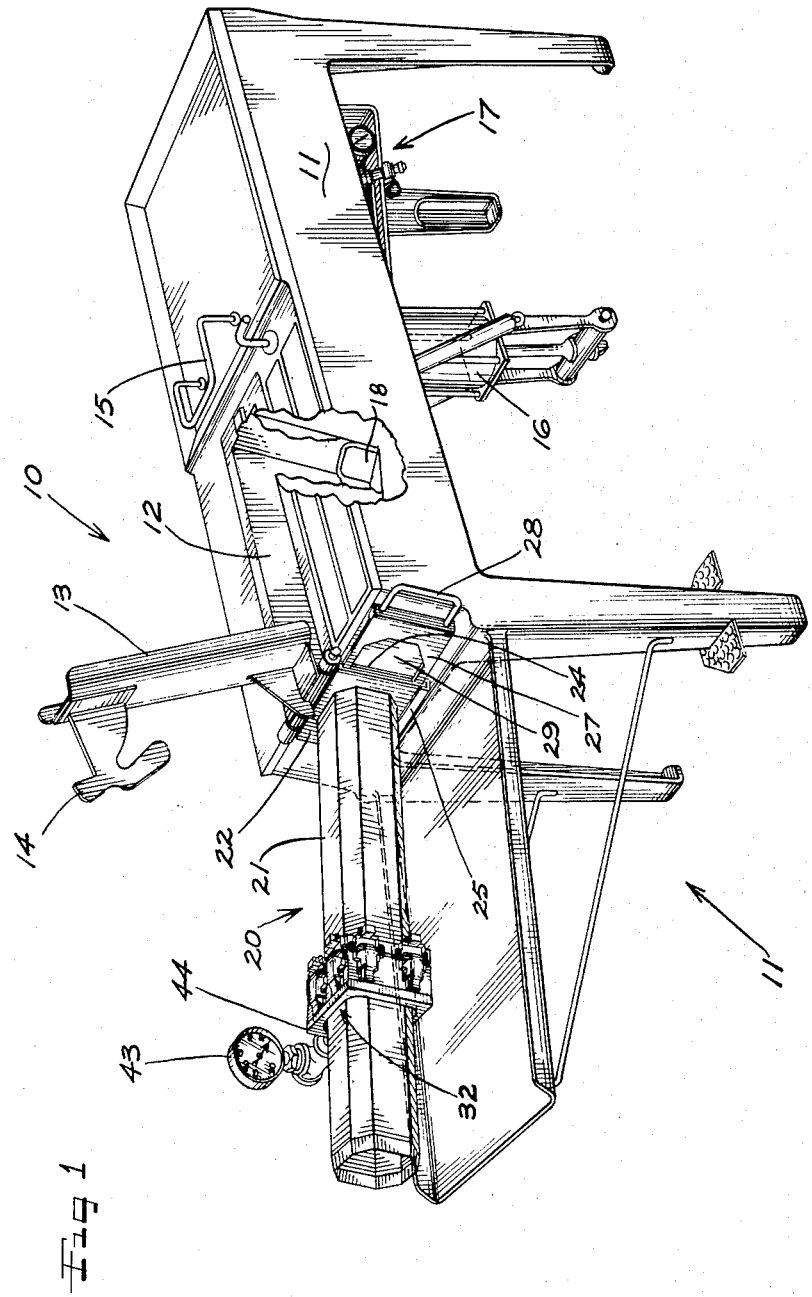
FIGURE 1 is a perspective view of a complete apparatus including a ham press, having a portion broken away, with the mold cavity shown in the open position and the device of the present invention attached thereto.

The present method and apparatus is used in conjunction with the usual type of ham press or meat forming device. One meat shaping apparatus generally 10 is shown in FIGURE 1 and comprises a frame 11 containing a mold cavity 12 at its forward end. The mold cavity has a pivotable top 13 hinged at the forward side thereof. The top 13 includes an upstanding anvil 14 which is engageable, when the top is closed upon the cavity 12, by a yoke 15 which is connected by tie rods to a pneumatic cylinder and piston apparatus generally 16.

The main operating element of the meat shaping apparatus generally 10 is an end ram 18 (shown in FIGURE 1) which is reciprocable through the mold cavity 12 and into a filling assembly generally 20 at the forward end of the machine. The end ram is actuated by a pneumatic cylinder and piston device generally 17 which may be seen beneath the frame of the machine.

In practicing the method of the present invention a boned body of meat is first inserted into the mold cavity 12 and the top 13 is thereafter closed and forced downwardly by the yoke 15 and pneumatic device 16 to shape the cross section of the meat material to conform generally to a container 19 within which it will be placed. Thereafter the end ram of the device is actuated to compress the material within the mold cavity 12 while it is blocked at the forward end. When the meat is thus shaped the blockage at the forward end of the mold cavity 12 is removed and the end ram advances the material into a holding zone within a filling assembly generally 20. Thereafter the end ram is immediately withdrawn and the forward end of the cavity again blocked so that the top 13 may be opened and a succeeding item of product placed within the cavity 12 for shaping. Meanwhile a container 19 is placed over the end of the filling assembly generally 20 and a vacuum drawn within the can and filling assembly through the space between the can and assembly. The meat material will then be drawn from the holding zone to the end of the filling assembly generally 20 where it is within the container. The second body of material, which has meanwhile been shaped in the pressing apparatus generally 10 is advanced into the space in the holding zone vacated by the preceding body of meat. We prefer to measure the degree of vacuum drawn between the container and filling assembly generally 20 and advance the second body of material only when the vacuum drawn corresponds to 15 to 18 inches of mercury.

Thereafter when the second body of meat is advanced into the holding zone it compresses a volume of air between it and the first body of meat. The compressed air presses against the rear end of the preceding body of meat with sufficient force to further pack the material into the can and break the vacuum between the filling assembly generally 20 and the container 19. The compression will also forcefully propel the meat within the container from the end of the filling assembly 20. Thereafter a second container is placed over the end of the filling assembly and the preceding steps are repeated.

An apparatus for carrying out this method is shown in FIGURES 1 through 3. Our improved filling assembly generally 20 comprises an elongated nozzle 21 which is welded to a nozzle plate 22. A top lip 23 along the upper edge of the nozzle plate 22 is formed to engage the upper surface of an adaptor plate 24 which in turn is welded to the forward end of the mold cavity 12 of the usual meat shaping apparatus generally 10. The adaptor plate 24 has a forwardly extending channel member 25 at the lower edge thereof adapted to receive the bottom of the nozzle plate 22 while leaving a space between the nozzle plate and the adaptor plate. The upper edge of the adaptor plate 24 also includes a hinge member 26 which cooperates with the top 13 of the mold cavity 12. When the top 13 is received in the hinge member 26 nozzle plate 22 is locked in position.

It will be noted that the nozzle 21 corresponds generally to the cross sectional shape of the molded item and is of a size and shape to be received readily within the container 19, as seen in FIGURE 2, wherein the meat will be placed. Customarily "Pullman" type hams are packed in rectangular cans having rounded corners, which measure about 4 and 5/8 inches by 4 and 7/8 inches in cross section and 10 to 14 inches in length. For canning this type of product we prefer to use an octagonal shaped nozzle which conforms generally to the foregoing cross sectional dimensions of the can. The four surfaces of the nozzle that do not correspond to the shape of the can (the beveled surfaces at the corners of the can when placed thereon) are useful for evacuating the can and are preferred for this reason. However it will also become obvious that the nozzle 21 could asume various cross sectional shapes, such as circular, and even triangular where containers of similar cross sections are to be filled. However in the latter instances it would be advantageous to longitudinally relieve portions of the nozzle wall to provide evacuation passageways between the nozzle and the walls of a corresponding container placed thereon.

The nozzle 21 is also substantially longer than the longest container to be filled thereon. Preferably the nozzle 21 is approximately twice as long as the maximum size container. Thus where containers ranging from ten to fourteen inches in length are to be filled the nozzle 21 is preferably about twenty-eight inches long.

As may be best seen in FIGURE 2, a slide plate 27 is reciprocably received in the space between the nozzle plate 22 and the adaptor plate 24. Air may enter into the nozzle from between nozzle plate 22 and the slide plate 27. The slide plate 27 has a handle 28 at one side and an opening 29 at one end thereof conforming to the mold cavity 12 and the interior of the nozzle 21. The slide plate 27 acts as a blocking means at the forward end of the mold cavity 12. When material is being shaped within the cavity 12 the plate is positioned with its blank end across the cavity. When it is desired to advance materials to the nozzle 21 the slide plate 27 is reciprocated so as to bring the opening 29 into alignment with the cavity and nozzle. In the illustrated embodiment the slide plate 27 is hand operated; however it could obviously be actuated by a mechanical device, such as a solenoid, either upon command of an operator or by an appropriate sequencing device.

The means for drawing a vacuum within a container when fitted upon nozzle 21 is in the form of a vacuum manifold assembly shown generally at 32. As may best be seen in the exploded view of FIGURE 2 the vacuum manifold assembly generally 32 comprises a lock plate 33, a locking ring 34 and a vacuum manifold 35. All of these pieces are shaped to slidingly fit about the exterior of the nozzle 21. The vacuum manifold 35 is machined to include a rear shoulder 36 (best seen in FIGURE 3) that is of the exact shape as the exterior of the nozzle 21 and of a size to closely engage the nozzle surface. The rear shoulder 36 is positioned toward the mold cavity 12 on the nozzle 21 with the locking ring 34 between it and the lock plate 33. An annular channel 37 is machined on the inner surface of the vacuum manifold 35 just forward of the rear shoulder 36. That channel completely encircles the nozzle 21 and provides a passageway thereabout. Just forward and adjacent the annular channel 37 the inner surface of the manifold 35 terminates in a forward shoulder member 38 which, in the preferred embodiment, is generally square in shape and has rounded corners. Thus a plurality of longitudinal spaces or passages between the manifold 35 and the surface of the nozzle 21 are in communication between the annular channel 37 and a forward face of the manifold 35.

A plurality of latches 39 are secured about the vacuum manifold 35 and lock plate 33. The latches 39 are secured when the manifold assembly generally 32 is in position on the nozzle 21, and compress the lock plate 33 and vacuum manifold 35 against the locking ring 34, which is preferably of a compressible neoprene material. The compressive action of the latches 39 forces the locking ring 34 against the nozzle 21 thereby securing the vacuum manifold assembly 32 in position and effectively sealing the rear side of the annular channel 37.

A vacuum port 41 is drilled through the vacuum nozzle 35 into the annular channel 37. A conduit 42 is connected between the port 41 and a suitable vacuum source, not shown. Preferably a vacuum gauge 43 is connected to the conduit 42 adjacent the vacuum manifold assembly 32.

The forward face of the vacuum manifold 35 is covered with a sealing ring 44 which is preferably composed of a resilient material such as neoprene rubber, adhesively affixed to the vacuum manifold. The sealing ring 44 forms a seal against which the open end of the container 19 may be placed and will fill any small irregularity in the end of such a container to provide a tight connection to the annular channel 37 and the source of vacuum.

It will be observed in FIGURE 2 that when the rectangular can 19 is placed upon the preferred octagonal nozzle 21, four passageways are formed by the corners of the can and the diagonal surfaces of the nozzle, and extend from the vacuum manifold 35 to the bottom of the can. The latter passageways facilitate evacuation of the can and nozzle and themselves become evacuated to hold the can on the nozzle even when completely filled with product.

In operation the vacuum manifold assembly 32 is unlatched and moved longitudinally on the nozzle 21 to a position where the sealing ring 44 will engage the open end of container 19 when fully inserted upon the nozzle 21 (with a slight clearance between the end of nozzle 21 and the bottom of the container). The latches are then closed securing the vacuum manifold assembly 32, in place, and the vacuum source is connected to the conduit 42 and port 41. Thereafter the slide plate 27 is moved to close the end of the mold cavity 12, and the first body of meat is then shaped by the shaping apparatus 10. Thereafter the slide plate 27 is moved to align its opening 29 with the nozzle 21 and mold cavity 12, and the shaped item of meat is advanced into the holding zone of the nozzle 21 which extends generally from just beyond the slide plate 27 to about the position of the vacuum manifold assembly 32. The slide plate 27 is then again moved to the closed position, after retracting the end ram of the shaping apparatus 10, and a container is placed over the end of the nozzle 21 and against the sealing ring 44. Immediately thereafter the next succeeding item of meat is shaped in the apparatus generally 10 while the space within the container and nozzle 21 is advance of the first item of meat becomes evacuated. Evacuation of that space will pull the item of meat to the forward end of the nozzle 21 and fully into the container placed thereon. Subsequently when the succeeding item has been shaped the slide plate 27 is again reciprocated and the next item advanced into the holding zone section of the nozzle 21. This action will compress a quantity of air within the nozzle 21 between the two items of meat with sufficient force to further shape the meat in the container and break the vacuum seal between the container and sealing ring 44 and effectively propel the item of meat within the container from the end of nozzle 21.

Obviously, many modifications and variations of the invention as hereinbefore set forth may be made without departing from the spirit and scope thereof, and therefore only such limitations should be imposed as are indicated in the appended claims.

We claim:

1. An improved device to be used in connection with a shaping apparatus for inserting a shaped body of food material into a container, said device comprising: a nozzle means extending from the discharge end of the shaping apparatus, an end of said nozzle means opposite said shaping apparatus adapted to receive a container of relatively larger cross section thereover; and a vacuum means on the exterior of said nozzle means at a position to be engageably by a container thereon, said vacuum means adapted to withdraw air from the container through the space between said container and said nozzle whereby to draw a body of material within the nozzle means from a position adjacent the shaping apparatus to the end of said nozzle supporting said container.

2. An improved device to be used in connection with a shaping apparatus for inserting a shaped body of food material into a container, said device comprising: a nozzle member extending from the discharge end of the shaping apparatus, said nozzle member being of substantially greater length than the body of food material and having an end opposite said shaping apparatus adapted to receive a container of relatively larger cross section thereover; and a vacuum manifold on the exterior of said nozzle member at a position to be engageable by a container thereon, said vacuum manifold adapted to withdraw air from the container through space between said container and said nozzle whereby to draw a body of material within the nozzle member from a position adjacent the shaping apparatus to the end of said nozzle supporting said container and to hold said container on said nozzle member.

3. An improved apparatus for shaping and inserting a body of food material into a container wherein the food material is shaped in a cavity mold, said improved apparatus comprising: a nozzle extending from one end of the cavity, said nozzle being substantially longer than the shaped body of material and adapted to receive a container of relatively larger cross section over its end; a blocking means insertable between said cavity mold and said nozzle; ram means reciprocable through said cavity into said nozzle for shaping material and forcing it into said nozzle; an annular vacuum manifold encircling the exterior of said nozzle, said manifold being spaced from said end of said nozzle a distance substantially equal to the length of the container for said shaped material and adapted to withdraw air from the space between said nozzle and a container placed thereon.

4. In an apparatus for shaping food material in a cavity mold and inserting the shaped material into a container having a given cross sectional shape, the improvement comprising: a nozzle extending from one end of the cavity and adapted to receive a container upon the end thereof, said nozzle being substantially longer than the shaped body of food and having a cross sectional shape that, when inserted within said container, will define longitudinal passage means between the walls of said container and said nozzle; a blocking means reciprocably mounted between said cavity mold and said nozzle; and an annular vacuum manifold encircling the exterior of said nozzle at a distance from the end thereof substantially equal to the length of said container, said manifold containing an annular channel and having a plurality of passageways connecting said channel and a face of said manifold toward said end of said nozzle.

5. In an apparatus for shaping food material in a cavity mold and inserting the shaped material into a container having a rectangular cross section; the improvement comprising: a nozzle extending from one end of the cavity, said nozzle being substantially longer than the shaped body of food and having an octagonal exterior cross section insertable within the container for receiving the food material; a blocking means reciprocably mounted between said cavity mold and said nozzle; and an annular vacuum manifold encircling the exterior of said nozzle at a distance from the end thereof substantially equal to the length of said container for receiving the shaped material, said manifold containing an annular channel and having a plurality of passageways connecting said channel and a face of said manifold toward said end of said nozzle.

6. In an apparatus for shaping food material in a cavity mold and inserting the shaped material into a container having a rectangular cross section, the improvement comprising: a nozzle extending from one end of the cavity, said nozzle being substantially longer than the shaped body of food and having an octagonal exterior cross section insertable within the container for receiving the food material; an annular vacuum manifold encircling the exterior of said nozzle at a distance from the end thereof substantially equal to the length of said container for receiving the shaped material, said manifold containing an annular channel and having a plurality of passageways connecting said channel and a face of said manifold toward said end of said nozzle; a resilient sealing ring on said face of said manifold for seating an open end of a container placed over said nozzle; a locking plate fastenable to the opposite face of said manifold; and a locking ring between said locking plate and said manifold to secure the manifold in position on said nozzle.

References Cited by the Examiner

UNITED STATES PATENTS

| | | | |
|---|---|---|---|
| 2,337,406 | 12/1943 | Opie | 53—122 |
| 2,696,442 | 12/1954 | Allbright | 99—187 |
| 2,696,443 | 12/1954 | Allbright | 99—187 |
| 2,842,923 | 7/1958 | Kjellsen | 302—2 X |
| 2,879,593 | 3/1959 | Schwartz | 31—42 |
| 3,041,153 | 6/1962 | Elder et al. | 31—42 X |

LEVERNE D. GEIGER, *Primary Examiner.*